(12) United States Patent
Chang

(10) Patent No.: US 9,046,933 B2
(45) Date of Patent: Jun. 2, 2015

(54) DISPLAYING THREE-DIMENSIONAL IMAGE DATA

(75) Inventor: Xianglong Chang, Burnaby (CA)

(73) Assignee: McKesson Financial Holdings

( * ) Notice: Subject to any disclaimer, the term of this patent is extended or adjusted under 35 U.S.C. 154(b) by 427 days.

(21) Appl. No.: 13/185,760

(22) Filed: Jul. 19, 2011

(65) Prior Publication Data

US 2013/0021323 A1 Jan. 24, 2013

(51) Int. Cl.
*G06F 3/0481* (2013.01)
*G06F 3/03* (2006.01)

(52) U.S. Cl.
CPC .......... *G06F 3/0325* (2013.01); *G06F 3/04815* (2013.01)

(58) Field of Classification Search
CPC ...... G06T 15/00; G06T 19/00; G06F 3/04815
See application file for complete search history.

(56) References Cited

U.S. PATENT DOCUMENTS

| 7,001,023 | B2 | 2/2006 | Lee |
| 7,421,111 | B2 | 9/2008 | Dietz |
| 2005/0248549 | A1 | 11/2005 | Dietz |
| 2006/0170871 | A1 | 8/2006 | Dietz |
| 2007/0185697 | A1 | 8/2007 | Tan |
| 2011/0149043 | A1* | 6/2011 | Koh et al. .................. 348/46 |

OTHER PUBLICATIONS

Lee, Johnny Chung. "Interaction techniques using the Wii Remote." Presentation at the annual TED conference. Monterey, California. See http://www.cs.cmu.edu/~johnny/projects/wii. May 2008.*
Wingrave, Chadwick A., et al. "The wiimote and beyond: Spatially convenient devices for 3d user interfaces." Computer Graphics and Applications, IEEE 30.2 (2010): 71-85.*
Yang-Wai Chow, *3D Spatial Interaction with the Wii Remote for Head-Mounted Display Virtual Reality*, World Academy of Science, Engineering and Technology 50 2009 pp. 377-383.
Vural et al., *Using Head and Finger Tracking with Wiimote For Google Earth Control*, 2008 Department of Computer Engineering Middle East Technical University.
Wang, D. et al. *Low-Cost Motion Capturing Using Nintendo Wii Remote Controllers*, CSC2228 Project Report, Fall 2008.
Frohnmayer, et al. *WiiRtrack—an evaluation of a low cost head tracking based on the Wiimote*, Mar. 4, 2010, http://fwiineur.blogspot.com/2010/03/wiimote-and-latest-human-computer.html.
Lee, J.C. *Hacking the Nintendo Wii Remote*, Pervasive Computing, vol. &, No. 3, 2008, pp. 39-45.
Lee, J.C. *Head Tracking for Desktop VR Displays using the Wii Remote*, 2007, http://johnnylee.net/projects/wii/.
Kevin Hejn, "Headtracking using a Wiimote", Graduate project, 7.5 ECTS, 2008, Department of Computer Science, University of Copenhagen.
Mbulelo Ntlangu, "Head Tracking with Nintendo Wiimote to view Terrain Maps", Bachelor's degree thesis, 2008, Department of Electrical Engineering, University of Cape Town.

* cited by examiner

*Primary Examiner* — Kee M Tung
*Assistant Examiner* — Ryan M Gray
(74) *Attorney, Agent, or Firm* — Alston & Bird LLP

(57) ABSTRACT

Systems, methods, apparatus, and computer program products are provided for displaying three-dimensional image data. For example, the position of one or more markers can be tracked. Then, image may be displayed based at least in part on the position of the one or more markers.

24 Claims, 12 Drawing Sheets

DISPLAYING THREE-DIMENSIONAL IMAGE DATA

BACKGROUND

Using two-dimensional input devices for viewing three-dimensional image data is neither natural nor convenient. Moreover, typical two-dimensional input devices (e.g., joysticks, digital gloves, and/or the like) are handheld devices. Thus, a need exists for an intuitive and natural way of viewing three-dimensional image data.

BRIEF SUMMARY

In general, embodiments of the present invention provide systems, methods, apparatus, and computer program products for displaying three-dimensional image data.

In accordance with one aspect, a method for displaying three-dimensional image data is provided. In one embodiment, the method comprises (1) determining a distance between one or more markers and a tracking device, wherein the distance is determined based at least in part on position data associated with the one or more markers; (2) determining coordinates of the one or more markers in world space based at least in part on the position data associated with the one or more markers; (3) determining at least one rotation angle of the one or more markers in world space based at least in part on the position data associated with the one or more markers; and (4) causing display of three-dimensional image data based at least in part on (a) the distance between the one or more markers and the tracking device, (b) the coordinates of the one or more markers in world space, and (c) the at least one rotation angle of the one or more markers in world space.

In accordance with another aspect, a computer program product for displaying three-dimensional image data is provided. The computer program product may comprise at least one computer-readable storage medium having computer-readable program code portions stored therein, the computer-readable program code portions comprising executable portions configured to (1) determine a distance between one or more markers and a tracking device, wherein the distance is determined based at least in part on position data associated with the one or more markers; (2) determine coordinates of the one or more markers in world space based at least in part on the position data associated with the one or more markers; (3) determine at least one rotation angle of the one or more markers in world space based at least in part on the position data associated with the one or more markers; and (4) cause display of three-dimensional image data based at least in part on (a) the distance between the one or more markers and the tracking device, (b) the coordinates of the one or more markers in world space, and (c) the at least one rotation angle of the one or more markers in world space.

In accordance with yet another aspect, an apparatus comprising at least one processor and at least one memory including computer program code is provided. In one embodiment, the at least one memory and the computer program code may be configured to, with the processor, cause the apparatus to at least (1) determine a distance between one or more markers and a tracking device, wherein the distance is determined based at least in part on position data associated with the one or more markers; (2) determine coordinates of the one or more markers in world space based at least in part on the position data associated with the one or more markers; (3) determine at least one rotation angle of the one or more markers in world space based at least in part on the position data associated with the one or more markers; and (4) cause display of three-dimensional image data based at least in part on (a) the distance between the one or more markers and the tracking device, (b) the coordinates of the one or more markers in world space, and (c) the at least one rotation angle of the one or more markers in world space.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
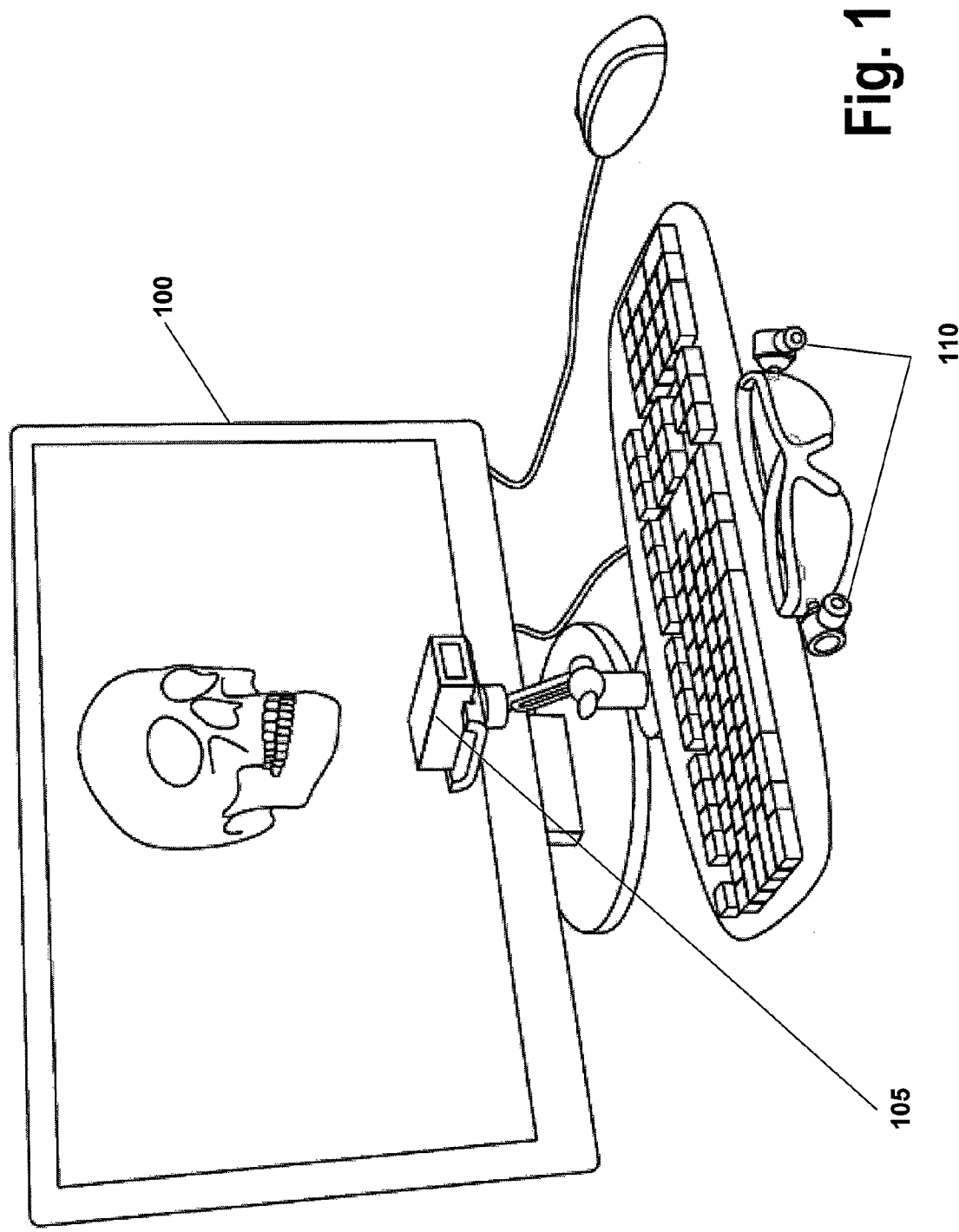
FIG. 1 is an overview of a system according to various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY ARCHITECTURE AND OPERATION

FIG. 1 provides an illustration of a system that can be used in conjunction with various embodiments of the present invention. As shown in FIG. 1, the system may include one or more computing devices 100, one or more tracking devices 105, and one or more markers 110. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Exemplary Computing Device

Figure 2:
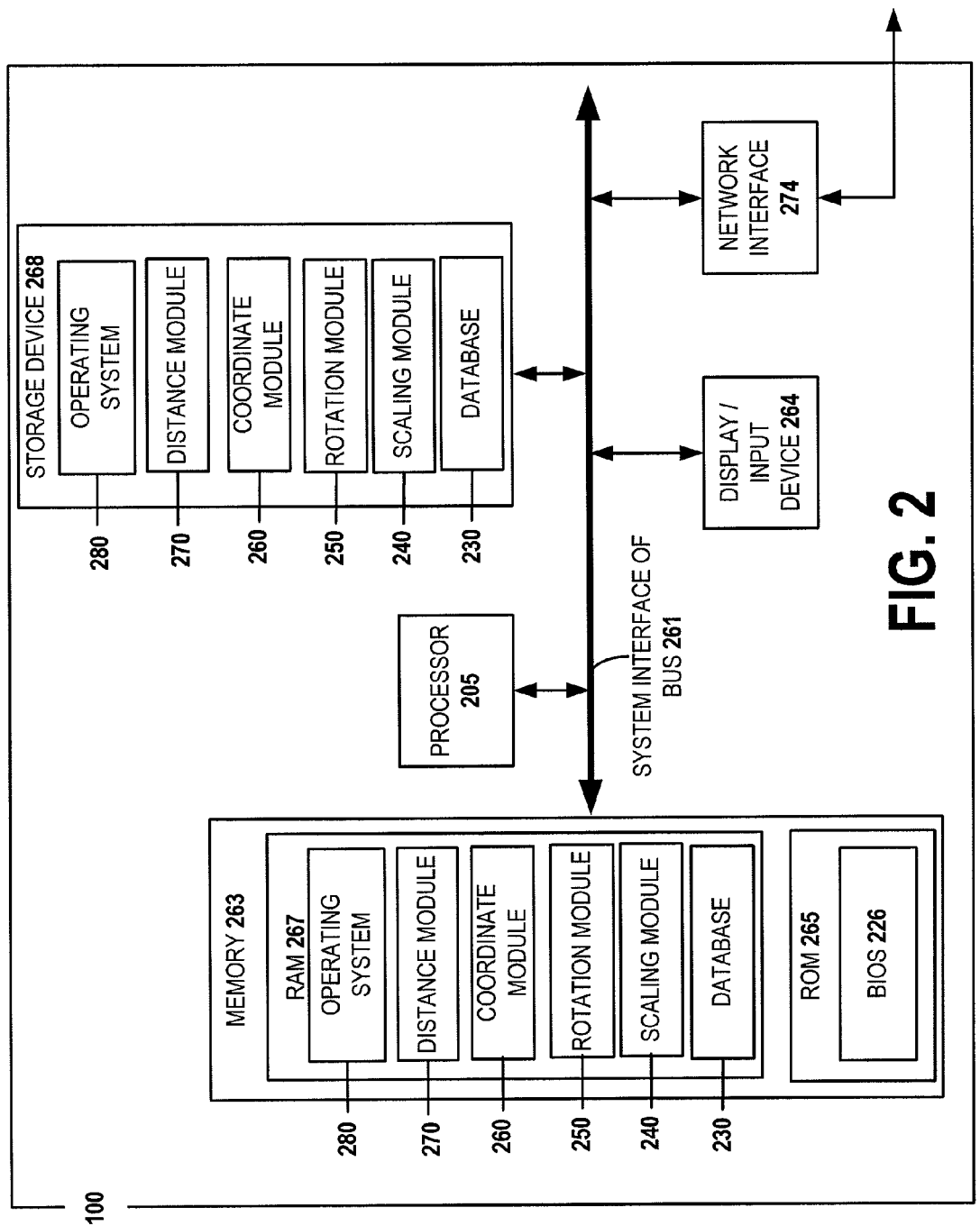
FIG. 2 is an exemplary schematic diagram of a computing device according to one embodiment of the present invention.

FIG. 2 provides a schematic of a computing device 100 according to one embodiment of the present invention. In general, the term "computing device" may refer to, for example, any computer, computing device, mobile phone, desktop, tablet, notebook or laptop, distributed system, server, blade, gateway, switch, processing device, or combination of processing devices adapted to perform the functions described herein. As will be understood from this figure, in one embodiment, the computing device 100 may include a processor 205 that communicates with other elements within the computing device 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display/input device 264 for receiving and displaying data (e.g., image data) may also be included in (or in communication with) the computing device 100. This display device/input device 264 may be, for example, a keyboard or pointing device that is used in combination with a monitor (e.g., an electronic screen/display). The display/input device 264 may be a touchscreen that can detect the presence and location of a touch within the display area. The computing device 100 may further include transitory and non-transitory memory 263, which may include both random access memory (RAM) 267 and read only memory (ROM) 265. The computing device's ROM 265 may be used to store a basic input/output system (BIOS) 226 containing the basic routines that help to transfer information to the different elements within the computing device 100.

In addition, in one embodiment, the computing device 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a distance module 270, a coordinate module 260, a rotation module 250, and a scaling module 240. As discussed in more detail below, these executable instructions, applications, program modules, and/or the like may control certain aspects of the operation of the computing device 100 with the assistance of the processor 205 and operating system 280—although their functionality need not be modularized. In addition to the program modules, the computing device 100 may store or be in communication with one or more databases, such as database 230.

Also located within the computing device 100, in one embodiment, is a network interface 274 for interfacing with various computing entities (e.g., with one or more tracking devices 105). For example, the computing device 100 may be able to receive data from and transmit data to the tracking devices 105. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the computing device's 100 components may be located remotely from other computing device 100 components. Furthermore, one or more of the components may be combined and additional components performing functions described herein may be included in the computing device 100.

2. Exemplary Tracking Device

Figure 3:
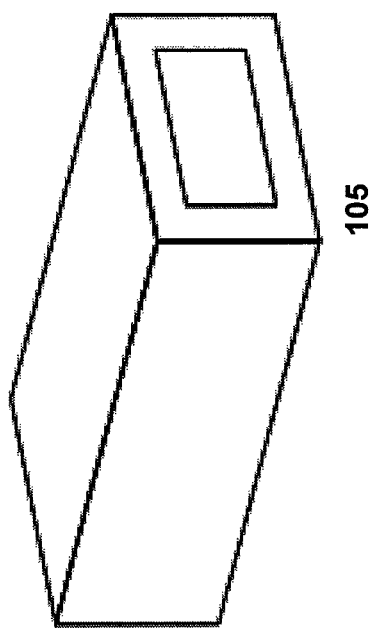
FIG. 3 illustrates an exemplary tracking device according to an exemplary embodiment of the present invention.

As shown in FIG. 3, in one embodiment, one or more tracking devices 105 may be used with embodiments of the present invention. A tracking device 105 may regularly, periodically, and/or continuously track the positioning/movement of one or more markers 110 (e.g., read/receive/collect/capture position data from the one or more markers 110). To do so, a tracking device 105 may include a camera capable of reading various types of markers 110. For example, in one embodiment, the tracking device 105 may have infrared cameras capable of reading infrared markers 110. Such a camera (or another camera) in the tracking device 105 may also be capable of reading various other types of light including visible light and/or ultraviolet light. In one example, a tracking device 105 may even be a Wii remote control.

In another embodiment, the tracking device 105 may include one or more emitters and phototransistors, for example, in the same housing for emitting radiation and reading the reflected radiation (e.g., reflected from reflective markers 110). For example, via an emitter, the tracking device 105 may emit radiation. The reflective markers 110 can reflect the radiation for detection by the tracking device's 105 phototransistor. As will be recognized, a variety of other approaches and techniques may also be used.

In one embodiment, the tracking devices 105 may be configured in an "outside-looking-in" configuration to track the positioning/movement of one or more markers 110. For example, the tracking device 105 can regularly, periodically, and/or continuously track the positioning/movement of one or more markers 110 (e.g., read/receive/collect/capture position data from the one or more markers 110). To do so, the tracking device 105 may include circuitry for multi-point blob tracking, such as blob tracking of up to 4, 6, and/or 8 points. The term "circuitry" may refer to (a) hardware-only electrical circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. The tracking device 105 may include a variety of other components, such as one or more accelerometers (e.g., a +/−3 g 8-bit 3-axis accelerometer). The tracking device 105 may also include a variety of expansion ports capable of supporting a variety of functions.

In one embodiment, the tracking device 105 may include a network interface for interfacing with various computing entities (e.g., with the computing device 100). For example, the tracking device 105 may regularly, periodically, and/or continuously transmit position data to the computing device 100. This communication may be via various wired or wireless networks, such as those described above with regard to the computing device 100.

3. Exemplary Markers

Figure 4:
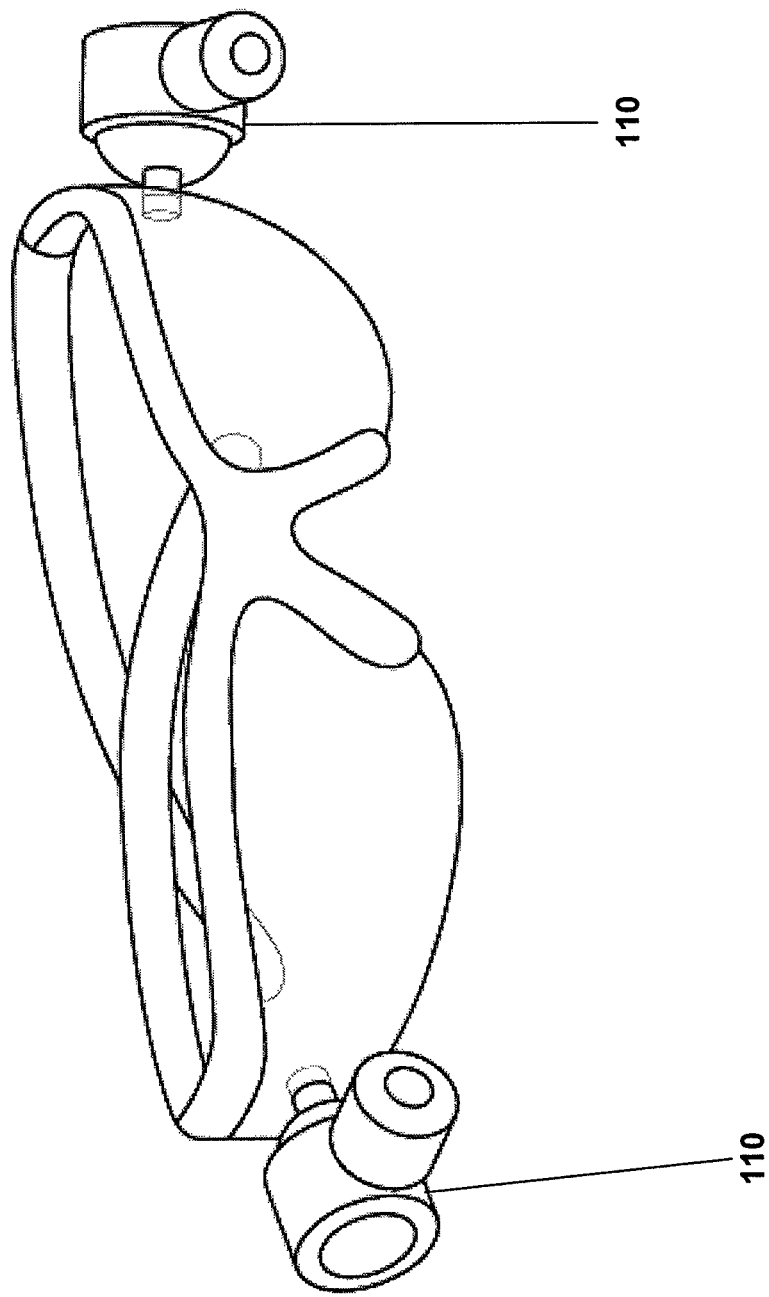
FIG. 4 illustrates exemplary markers attached to goggles/glasses according to one embodiment of the present invention.

As shown in FIG. 4, one or more markers 110 may be used to control the display of image data. In one embodiment, the markers 110 may include circuitry that enables them to emit infrared light. In another embodiment, the markers 110 may include circuitry, for example, that enables them to emit visible light and/or ultraviolet light. Additionally or alternatively, the markers 110 may include a control mechanism to control the emission of light, such as a toggle switch. In another embodiment, the markers 110 may be made, include, and/or be coated with reflective material. Such reflective materials may reflect various forms of radiation, light, and/or the like.

In one embodiment, one or more markers 110 may be affixed to (or otherwise attached to) an apparatus, device, and/or apparel worn by a user (e.g., radiologist, engineer, or video game player viewing 3D image data). For example, as shown in FIG. 4, one or more markers 110 may be mounted to a clip which can be easily attached to goggles/glasses to be worn by a user (e.g., radiologist, engineer, or video game player viewing 3D image data). Such goggles/glasses may be three-dimensional (3D) compatible to assist in viewing 3D image data. The goggles/glasses may also include a headset with a variety of other components, such as a microphone. In another embodiment, the markers 110 may be attached to a hat worn by a user. By a user wearing the goggles/glasses and/or hat, for example, the tracking device 105 and computing device 100 can be used to track the positioning/movement of the markers 110 (e.g., the position of the user's head) and thereby control display of image data. It should be noted that the foregoing examples are provided for illustrative purposes only and should not be taken in any way as limiting embodiments of the present invention to the examples provided.

III. EXEMPLARY SYSTEM OPERATION

Figure 5:
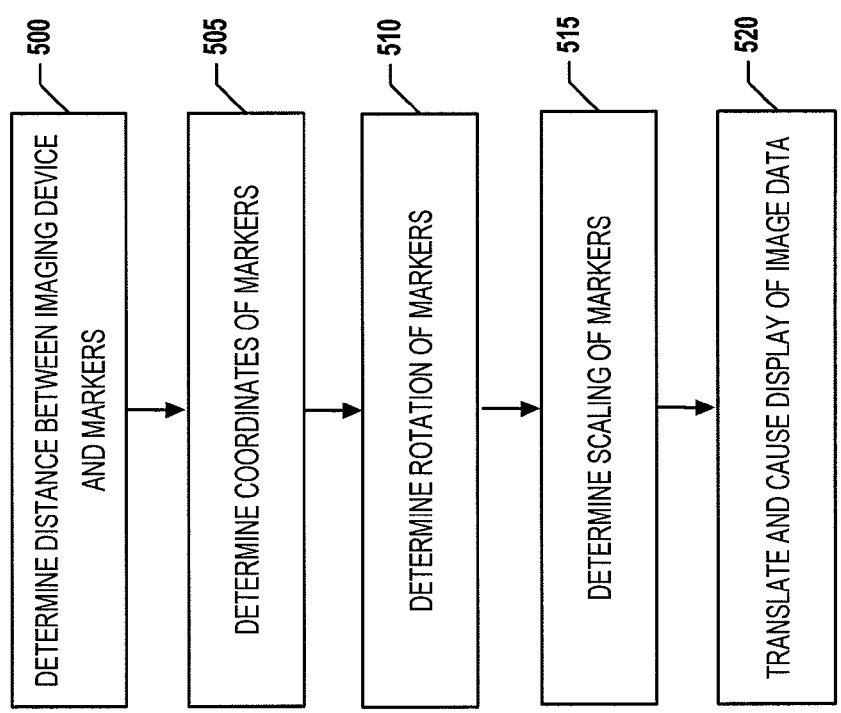
FIG. 5 is a flowchart illustrating operations and processes that can be used in accordance with various embodiments of the present invention.
Figure 8:
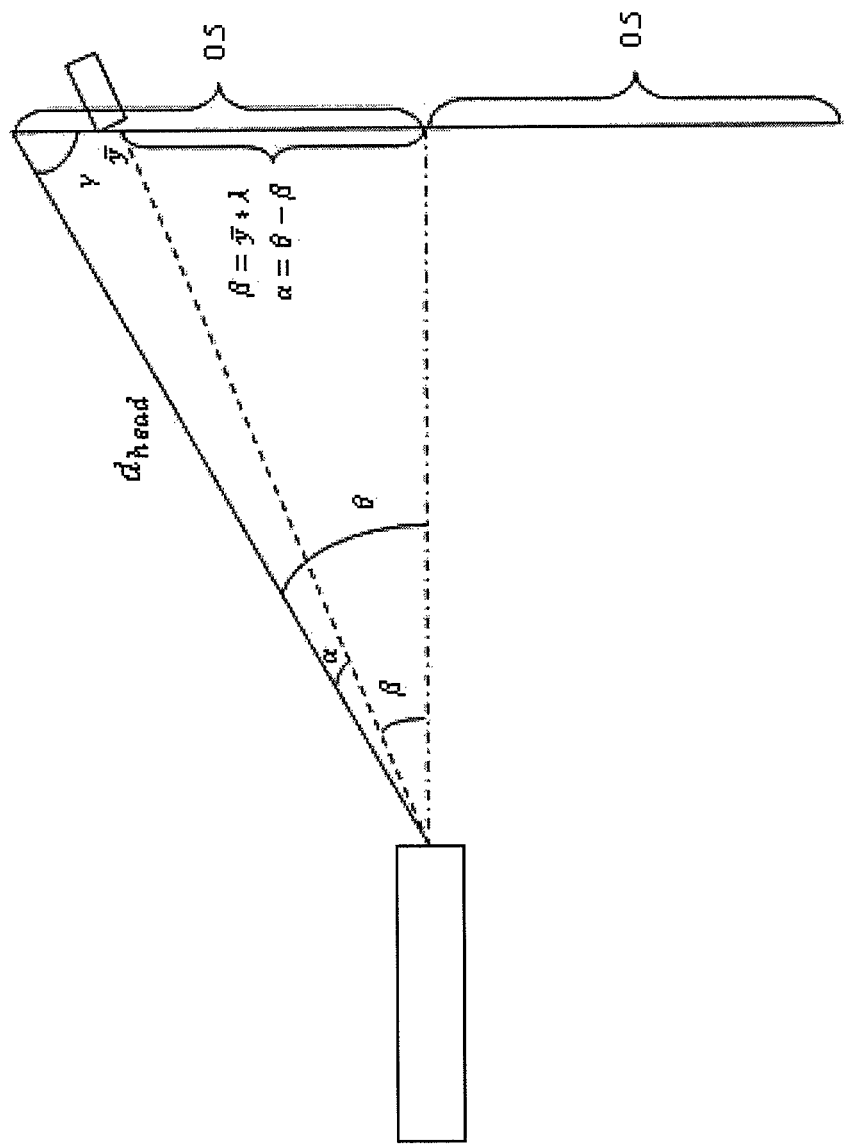
Figure 9:
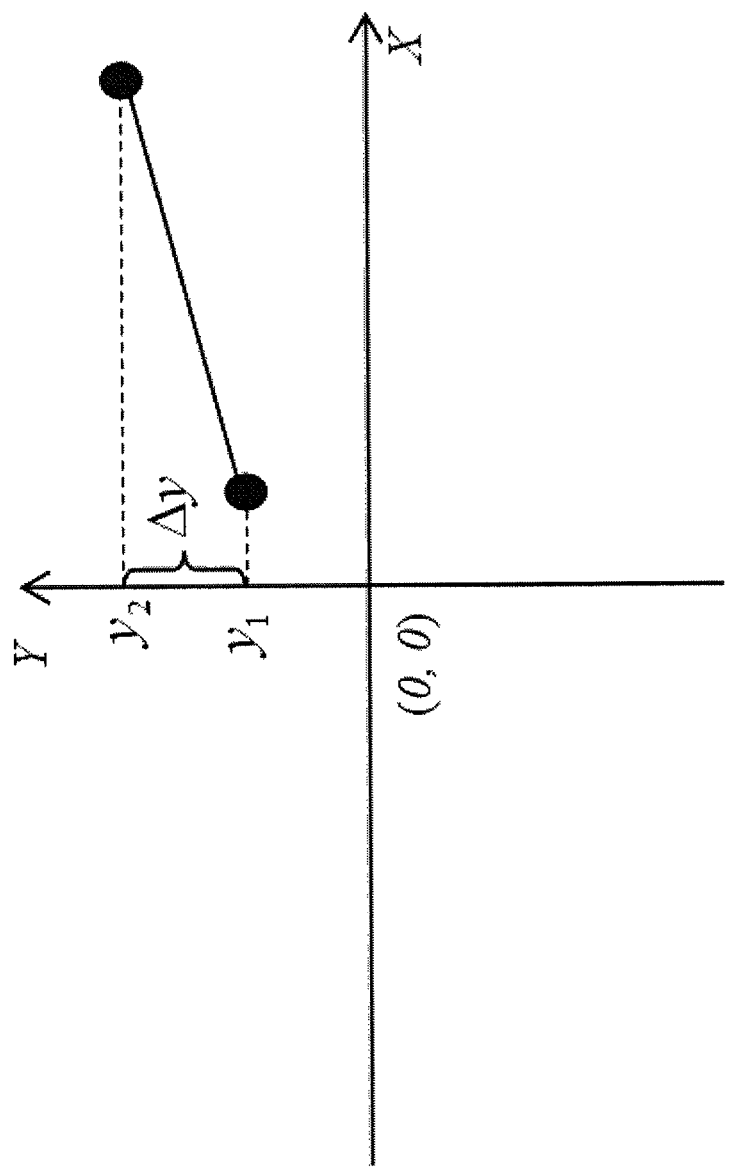
Figure 10:
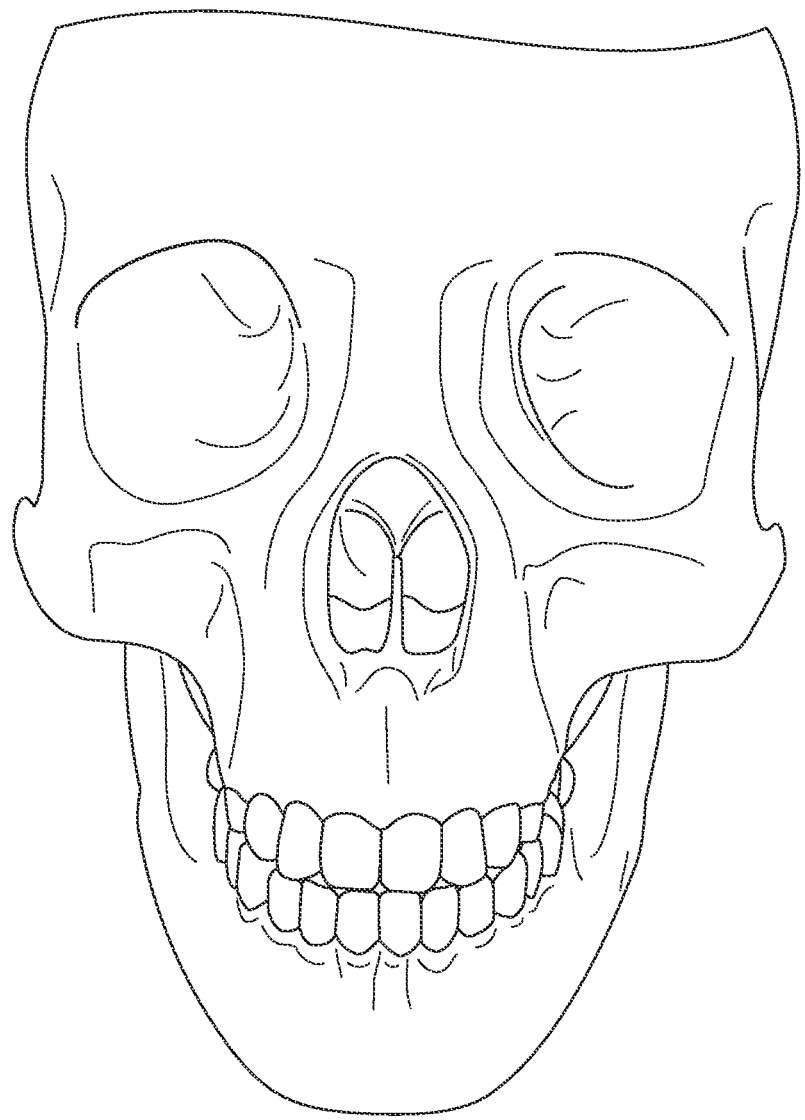
FIGS. 10-12 show exemplary input and output that can be used in accordance with various embodiments of the present invention.
Figure 11:
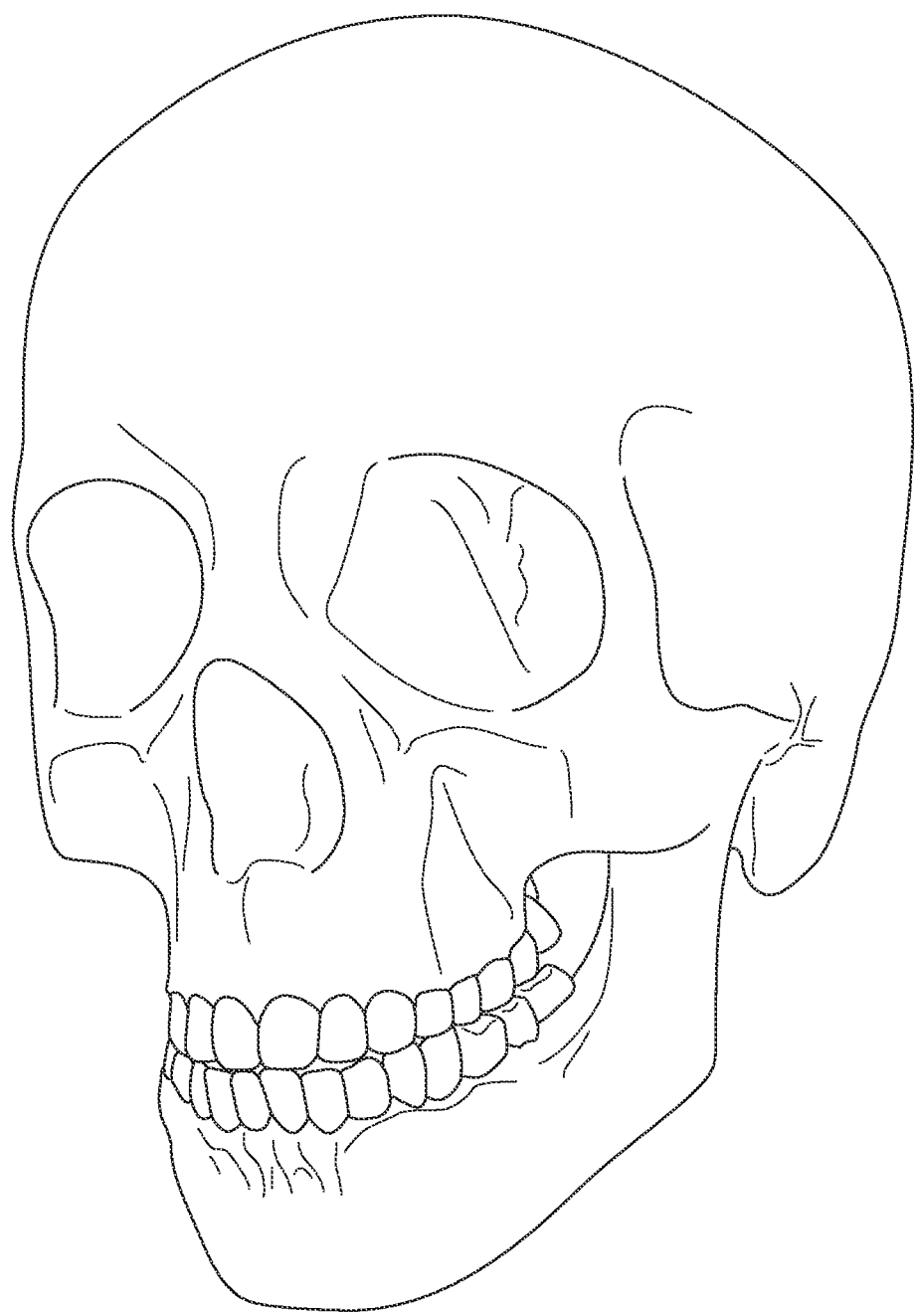
Figure 12:
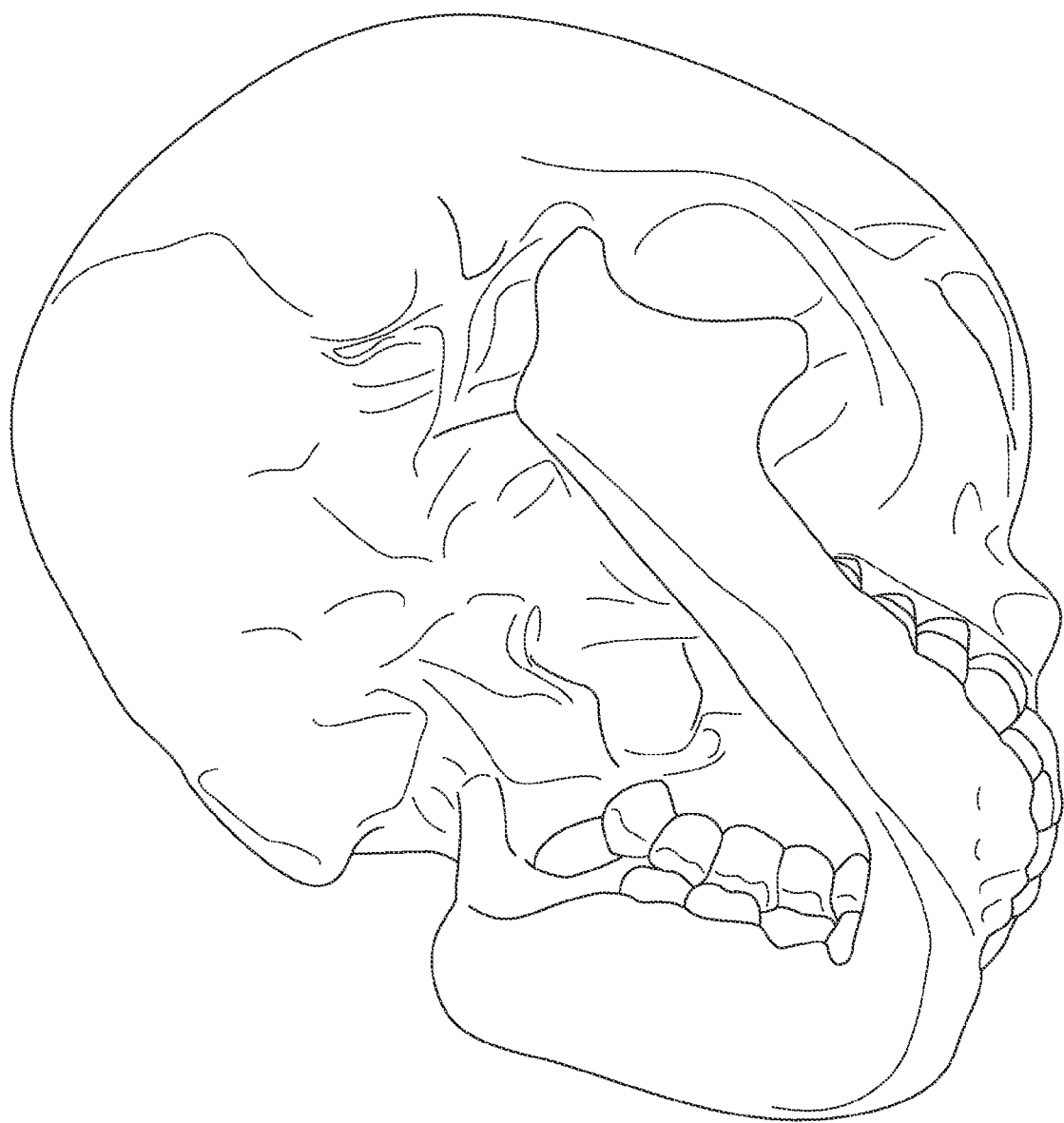

Reference will now be made to FIGS. 5-12. FIG. 5 illustrates operations and processes that can be used in accordance with various embodiments of the present invention. FIGS. 6-9 depict diagrams for understanding expressions used to control the display of image data in accordance with various embodiments of the present invention. FIGS. 10-12 show exemplary input and output that can be used in accordance with various embodiments of the present invention.

In various embodiments, the tracking device 105 can be used to track the positioning/movement of one or more markers 110 (e.g., the position of the user's head). The tracking device 105 can transmit position data (e.g., the positioning/movement of the markers 110) to the computing device 100, which indicate to the computing device 100 how image data should be displayed. For example, the computing device 100 may calculate the head distance, coordinate positions, rotation/tilt angles, and/or scaling for each frame of image data displayed. Based on such calculations, the size, rotation, and position of image data being displayed can be controlled by the positioning/movement of one or more markers 110. For instance, a radiologist can control how 3D image data of a skull (see FIGS. 10-12) is displayed by a computing device 100 based on the positioning/movement of one or more markers 110 attached to goggles/glasses he is wearing. Other examples include video game players controlling the display of a video game, for example, or engineers controlling the display of 3D Computer Aided Design (CAD) drawings.

The following example is provided in the context of a user wearing goggles/glasses with two markers 110 attached to the goggles/glasses. The example is further provided in the context of a tracking device 105 with a 45° field of view and a built-in camera (e.g., an infrared camera) with the resolution of 1024×768. As will be recognized, a variety of different markers 110, fields of view, and/or resolutions can be used with embodiments of the present invention. Moreover, the camera space (e.g., a transform of world space to a camera's point of view) in the following example, is a coordinate system whose origin is at the position of the head (e.g., two markers 110) of the user ($x_{head}$, $y_{head}$, $d_{head}$), and the y axis is pointing upwards (0, 1, 0) (e.g., to the sky), and the gaze direction is pointing to the ($x_{head}$, $y_{head}$, 0). In one embodiment, the transformations from world space to camera space can be done by a variety of frameworks, such as DirectX. Thus, the following examples are provided for illustrative purposes and are not limiting to embodiments of the present invention.

1. Exemplary Image Data

In one embodiment, image data can be generated from various imaging techniques and processes. For example, such imaging techniques and processes may include, for instance, fluoroscopy, magnetic resonance imaging (MRI), photoacoustic imaging, positron emission tomography (PET), projection radiography, computed axial tomography (CT scan), and/or ultrasound. Image data generated from these imaging techniques and processes may be used for clinical purposes (e.g., for conducting a medical examination and diagnosis) or scientific purposes (e.g., for studying the human anatomy). As indicated, the image data can be of a human body or one or more parts of the human body, but the image data can also be of other organisms or objects. Image data may contain a "volume of image data" or "volume," which may be a sequence of images (e.g., frames) that can be spatially related and assembled into a rectilinear block representing a three-dimensional region of, for example, patient anatomy. Thus, an image, such as a 3D image may be generated by combining multiple images.

In one embodiment, in addition to the range of image data and imaging techniques and processes, there may be a variety of views for each type of image data. For example, the different views of image data may include views along the original axis of image acquisition (e.g., axial to the patient's body) and/or multi-planar reconstruction (MPR) views orthogonal to this axis (e.g., sagittal and coronal to the patient's body). In various embodiments, 3D image data may benefit from embodiments of the present invention. For example, a user viewing image data may use a handsfree approach for controlling the display of the image data on a display.

As will be recognized, various types of image data can be used. For example, image data for viewing/playing video games, viewing 3D CAD drawings, viewing live sporting events, and/or the like may benefit from different embodiments of the present invention.

2. Exemplary Distance between Tracking Device and Markers

Figure 6:
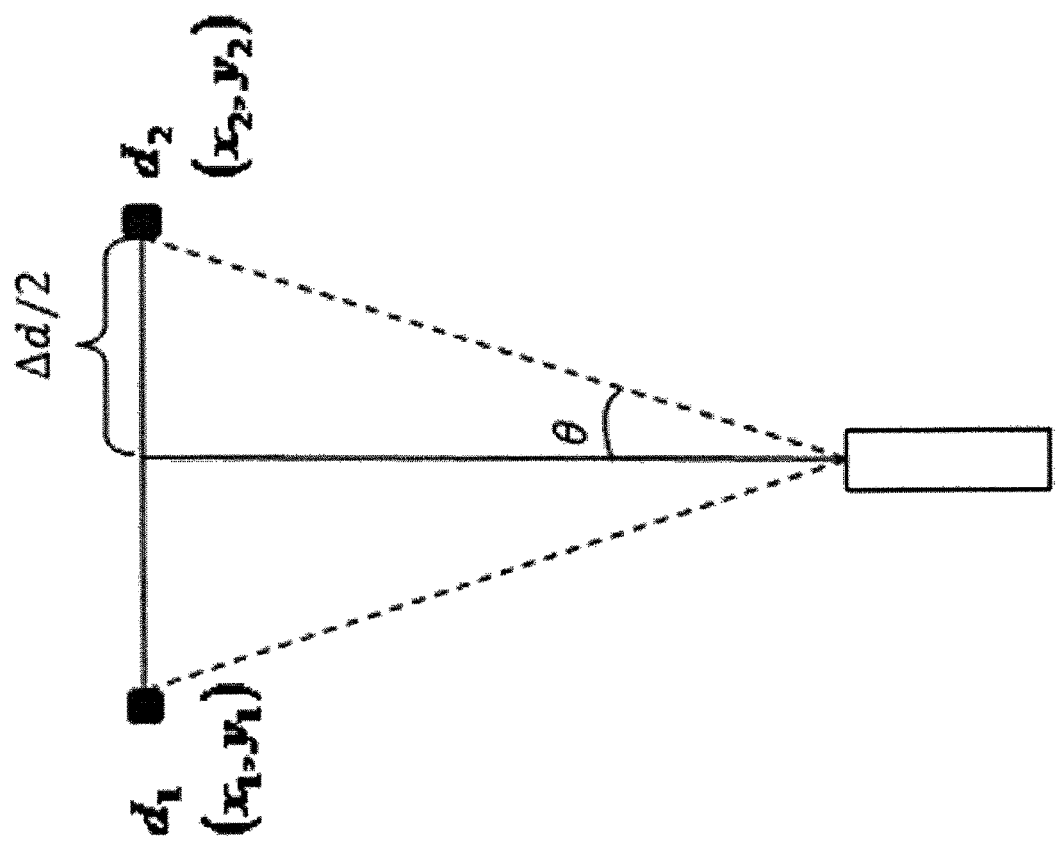
FIGS. 6-9 are diagrams for understanding calculations for displaying three-dimensional image data in accordance with various embodiments of the present invention.

In one embodiment, for displaying a frame of image data, the computing device 100 can determine the distance between the markers 110 and the tracking device 105 (e.g., $d_{head}$) (e.g., via the distance module 270). To do so, the computing device 110 can regularly, periodically, and/or continuously receive position data from the tracking device 105. For example, FIG. 6 shows a top-down view of a tracking device 105 and two markers 110 (e.g., attached to goggles/glasses worn on a user's head).

As shown in this figure, the computing device 100 can determine the relative distance (e.g., $\Delta d$) between the tracking device 105 and the two markers 110 using trigonometry functions. For instance, $d_1$ and $d_2$ are the projections of the two markers 110 on the image plane (e.g., the virtual image plane of the tracking device 105 with a resolution of 1024×768) of the tracking device 105. In this example, because the tracking device 105 has a 45° field of view and the image plane of resolution of 1024×768, the computing device 100 can map the angles to the image pixels. For example, the computing device 100 can determine the radians per pixel (e.g., $\lambda$) by evaluating the following expression:

$$\text{Radians per pixel: } \lambda = \frac{\frac{\pi}{4}}{1024}$$

In above expression, $\pi/4$ is used because the tracking device 105 has a 45° field of view. Moreover, 1024 is the horizontal resolution of the image plane of the built-in camera of the tracking device 105. Thus, the expression may vary based on the field of view and the resolution of the camera of the tracking device 105.

In one embodiment, the computing device 100 can also evaluate the distance ($\Delta d$) between the two markers 110 using the (x, y) coordinates on the image plane of the camera of the tracking device 105. For example, the computing device 100 can determine the distance between the two markers 110 (e.g., $\Delta d$) using the following expression:

$$\text{Distance between markers: } \Delta d = \sqrt{(x_2-x_1)^2+(y_2-y_1)^2}$$

In one embodiment, using the coefficient from the radians per pixel and the distance between the two markers 110, the computing device 100 can determine the angles of the markers 110 to the display (e.g., $\theta$). For example, the computing device 100 can evaluate the following expression to determine the angles of the markers 110 to the display (e.g., $\theta$):

$$\theta = \frac{\Delta d}{2}\lambda$$

Then, in one embodiment, the computing device 100 can determine the distance between the markers 110 and the tracking device 105 (e.g., $d_{head}$) in the world space (e.g., where objects are positioned and animated through appropriate transforms) using a tangent function. For example, the computing device 100 can determine the distance between the markers 110 and the tracking device 105 (e.g., $d_{head}$) using the following expression:

$$d_{head} = \frac{(D_{markers}/H_{screen})/2}{\tan\theta}$$

In this expression, $D_{markers}$ is a constant representing the physical distance in millimeters between the two markers 110. Also, $H_{screen}$ is a constant representing the height in millimeters of the computing device's 100 display.

In other words, the computing device 100 can determine the distance between the markers 110 and the tracking device 105 (e.g., $d_{head}$) using the radians per pixel (e.g., λ), the angles of the markers 110 to the display (e.g., θ), and the distance between the two markers 110 (e.g., Δd). In one embodiment, to control how three-dimensional image data should be displayed, the computing device 100 can determine the distance between the markers 110 and the tracking device 105 (e.g., $d_{head}$) for each frame displayed (Block 500 of FIG. 5). In other words, the tracking device 105 detects the positions of the markers 110 that are projected on the image plane and provides the position data to the computing device 100. The computing device 100 can use the position data (e.g., (x, y) coordinates of the markers 110 on the image plane) to evaluate the distance between the markers 110 and the tracking device 105 (e.g., $d_{head}$), and the relevant angles. As will be recognized, though, a variety of other approaches and techniques may be used.

3. Exemplary Coordinates of Markers in World Space

In one embodiment, once the computing device 100 determines the distance between the markers 110 and the tracking device 105 (e.g., $d_{head}$), the computing device 100 can determine the coordinates (x, y) of the markers 110 ($x_{head}$ and $y_{head}$) in world space with, for example, $d_{head}$ and the angles previously evaluated (Block 505 of FIG. 5). To do so, the computing device 110 can regularly, periodically, and/or continuously receive position data from the tracking device 105. For example, when the user (e.g., radiologist, engineer, or video game player) moves his head (e.g., wearing the apparatus with markers 110 attached thereto) from left to right, the computing device 100 can determine the angle of the left to right movement. Similarly, when the user (e.g., radiologist, engineer, or video game player viewing 3D image data) moves his head (e.g., wearing the apparatus with markers 110 attached thereto) from right to left, the computing device 100 can determine the angle of the right to left movement. The computing device 100 can use the coordinates to determine how 3D image data should be displayed.

i. Exemplary X-Coordinate in World Space

Figure 7:
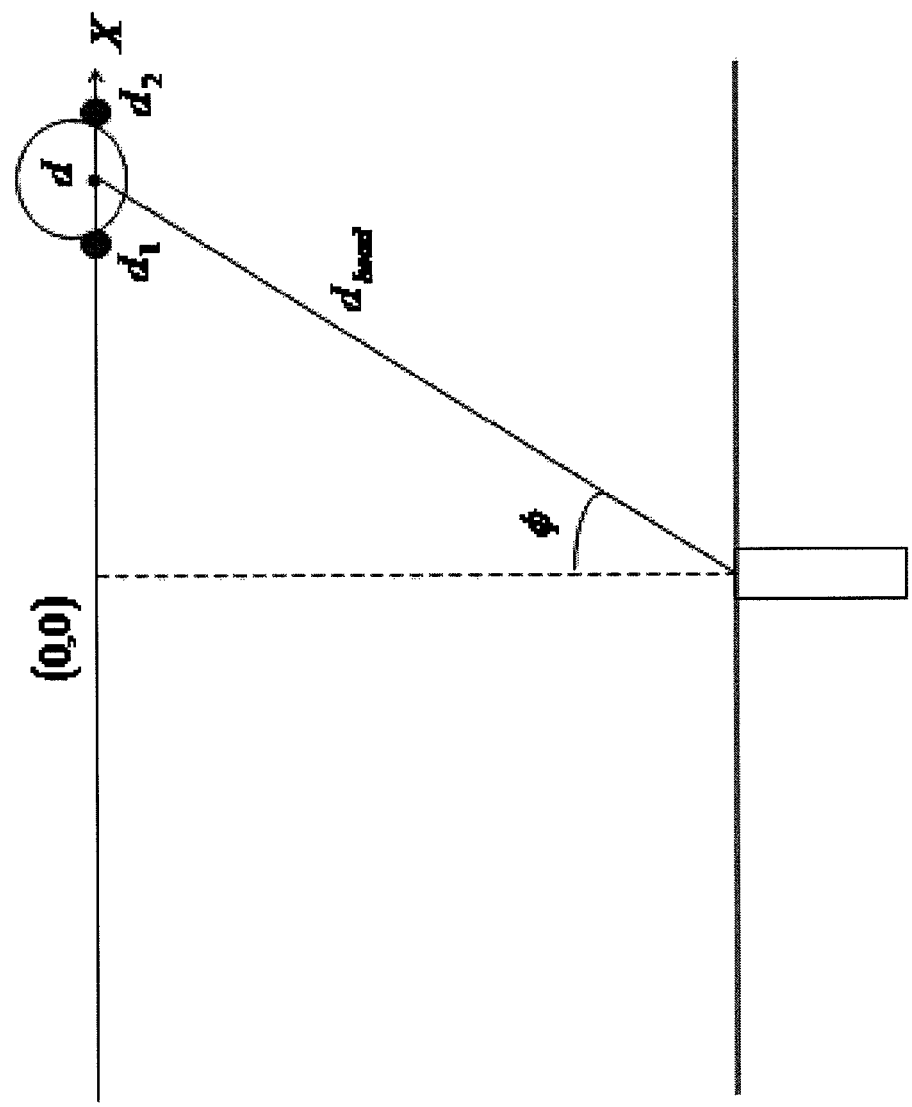

In one embodiment, by having determined the distance between the markers 110 and the tracking device 105 (e.g., $d_{head}$), the computing device 100 can determine the x-coordinate (viewing angle) of the markers 110 (e.g., head) in world space. For example, FIG. 7 shows a top-down view of a tracking device 105 and two markers 110 (e.g., attached to goggles/glasses worn on a user's head).

In one embodiment, the x-coordinate of the markers 110 (e.g., head) in world space can be determined using the following expression: $x_{head} = d_{head} \sin \phi$. In this expression, d is the center point of $\overline{d_1 d_2}$. The origin of the image plane is at (0,0). Thus, the coordinates of d can be determined by the following expression:

$$\text{Coordinates of } d \text{ (center point of } \overline{d_1 d_2}\text{): } \left(\frac{x_1 + x_2}{2}, \frac{y_1 + y_2}{2}\right)$$

Still further, in the expression for determining the x-coordinate of the markers 110 (e.g., $x_{head} = d_{head} \sin \phi$), the viewing angle (e.g., φ) can be determined by the following expression:

$$\phi = \left(\frac{x_1 + x_2}{2} - 512\right)\lambda$$

In this example, 512 is ½ of the horizontal resolution of the camera of the tracking device 105 (e.g., 1024). Thus, this value may vary depending on the horizontal resolution of the camera of the tracking device 105 being used. In this example, the initially determined radians per pixel coefficient (e.g., λ) is still used. Thus, the computing device 100 can determine the x-coordinate of the markers 110 (e.g., head) in world space using the following expression: $x_{head} = d_{head} \sin \phi$. In one embodiment, the computing device 100 can determine the x-coordinate of the markers 110 (e.g., head) in world space for each frame of image data displayed. For example, via such calculations, the computing device 100 can determine how 3D image data should be displayed. As will be recognized, a variety of other approaches and techniques may be used.

ii. Exemplary Y-Coordinate in World Space

In one embodiment, by having determined the distance between the markers 110 and the tracking device 105 (e.g., $d_{head}$), the computing device 100 can determine the y-coordinate (e.g., $y_{head}$) of the markers 110 (e.g., head) in world space. For example, FIG. 8 shows a side view of a tracking device 105 and a marker 110 (e.g., attached to goggles/glasses worn on a user's head). In the initial calibration, the computing device 100 assumes that the markers 110 (e.g., user's head) are at the top of the image plane.

In this embodiment, to determine the y-coordinate (e.g., $y_{head}$) of the marker 110 (e.g., head) in world space, the computing device 100 can evaluate the following expression: $y_{head} = \pm 0.5 + d_{head} \sin(\alpha + \beta)$. As will be recognized, the ±0.5 value of this expression may vary based on the positioning of the tracking device 105. For example, in one embodiment, the tracking device 105 may be positioned above the display of the computing device 100. In such a case, +0.5 is used in the expression. In another embodiment, the tracking device 105 may be positioned below the display of the computing device 100. In such a case, −0.5 is used in the expression. Thus, ±0.5 is a buffer to offset (e.g., an offset) the position of the tracking device 105 with regard to the display. In the following example, the computing device 100 assumes the tracking device 105 is positioned below the display of the computing device 100.

In this example, as shown in FIG. 8, $\overline{y}$ is the average point of the two markers 110. Based on these assumptions, the relative vertical angle (e.g., β) can be determined by the following expression: $\beta = \overline{y} * \lambda$ (e.g., the vertical angle is relative to the pointing direction of the tracking device 105, such as shown in FIG. 8). The values for $y_1$ and $y_2$ (e.g., for determining) $\overline{y}$ can be used from the previously evaluated expression used to determine the distance between the markers shown in FIG. 6 (e.g., $\Delta d = \sqrt{(x_2 - x_1)^2 + (y_2 - y_1)^2}$. Accordingly, the relative vertical angle (e.g., β) can be determined using the following expression:

$$\beta = \left(\frac{y_1 + y_2}{2} - 384\right)\lambda$$

In this expression, 384 is ½ of the vertical resolution of the camera of the tracking device 105 (e.g., 768). Thus, this value may vary depending on the vertical resolution of the camera of the tracking device 105 being used. Also, in this example, the initially determined radians per pixel coefficient (e.g., λ) is still used.

In one embodiment, the computing device 100 can determine the angle of the markers 110 to the tracking device 105 being used (e.g., θ). As shown in FIG. 8, γ is a temporary angle for evaluating θ during calibration.

$$\gamma = \arccos\left(\frac{0.5}{d_{head}}\right)$$

Moreover, the computing device 100 can determine the tracking device 105 vertical angle (e.g., α). In one embodiment, the tracking device 105 vertical angle (e.g., α) is a constant angle evaluated during calibration. The tracking device 105 vertical angle (e.g., α) can be determined by evaluating the following expression: α=θ−β. In one embodiment, α is to offset the difference between the markers' 110 position and the position of the top of the head. For instance, the markers 110 can be attached to goggles and worn by a user, but the computing device 100 uses the position of the top of the head in the calibration (e.g., the oval shape is to represent the head of the user). Thus, after the computing device 100 determines θ (e.g., the angle of the markers 110 to the tracking device 105 being used), the computing device 100 can determine α by evaluating the appropriate expression.

Thus, the computing device 100 can determine the y-coordinate viewing angle (e.g., $y_{head}$) of the markers 110 (e.g., head) in world space by evaluating the following expression: $y_{head} \pm 0.5 + d_{head} \sin(\alpha+\beta)$. In one embodiment, the computing device 100 can determine the y-coordinate of the markers 110 (e.g., head) in world space for each frame of image data displayed. For example, via such calculations, the computing device 100 can determine how 3D image data should be displayed. As will be recognized, a variety of other approaches and techniques may be used.

4. Exemplary Rotation of Markers in World Space

In one embodiment, as indicated in Block 510 of FIG. 5, the computing device 100 can determine rotation angles around the x-y-z axes of the markers 110 (e.g., head) in world space (e.g., via the rotation module 250). To do so, the computing device 110 can regularly, periodically, and/or continuously receive position data from the tracking device 105. Via the position data, the computing device 100 can determine how 3D image data should be displayed.

i. Exemplary Rotation Around Y-Axis

In one embodiment, the computing device 100 can determine rotation angles around the y-axis in world space. For example, as shown in FIG. 8, the viewing angle φ represents how much the markers 110 (e.g., head) move away along the x-axis from the center. This may also represent the direction in which the head is moving. Thus, using this information, the computing device 100 can determine how much the image data being displayed should rotate around the y-axis. Thus, to evaluate a rotation angle around the y-axis, the computing device 100 can evaluate the following expression:

$$\rho_y = -\phi\varepsilon = \left(512 - \frac{x_1 + x_2}{2}\right)\lambda\varepsilon$$

In this example, 512 is ½ of the horizontal resolution of the camera of the tracking device 105 (e.g., 1024) being used. Thus, this value may vary depending on the horizontal resolution of the camera of the tracking device 105 being used. The negative sign indicates that the direction of the rotation of the image data being displayed by the computing device 110 should be opposite of where the head (e.g., markers 110) is moving. For example, if the user turns his head (e.g., markers 110) from left to right, the computing device 100 should cause the image data being displayed to rotate in a substantially corresponding manner in a right to left direction, such as shown in FIGS. 10 and 11. Also, in one embodiment, ϵ is a scaling constant to control the magnitude of the rotation and/or the sensitivity of the rotation. In one embodiment, the computing device 100 can determine a rotation angle around the y-axis for each frame of image data displayed. As will be recognized, a variety of other approaches and techniques may be used.

ii. Exemplary Rotation Around X-Axis

In one embodiment, the computing device 100 can determine rotation angles around the x-axis in world space. In one embodiment, the rotation around the x-axis is different from the rotation around the y-axis. In particular, this is because of the offset (e.g., ±0.5) introduced along the y-axis to balance the position of the tracking device 105. Thus, to evaluate the rotation of around the x-axis, the computing device 100 can use $y_{head}$ as a reference of the rotation angle. Thus, to evaluate a rotation angle around the y-axis, the computing device 100 can evaluate the following expression:

$$\rho_x = -y_{head}\epsilon_x$$

In one embodiment, the negative sign indicates that the direction of the rotation of the image data being displayed should be opposite of where the head (e.g., markers 110) is moving. For example, if the user moves his head (e.g., the markers 110) in a downward motion, the computing device 100 should cause the image data being displayed to be displayed in a substantially corresponding upward motion, such as shown in FIGS. 10 and 12. In one embodiment, as with the rotation around the x-axis, $\epsilon_x$ is a scaling constant to control the magnitude of the rotation and/or the sensitivity of the rotation. In one embodiment, the computing device 100 can determine a rotation angle around the y-axis for each frame of image data displayed. Thus, using this information, the computing device 100 can determine how much the image data being displayed should rotate around the x-axis. As will be recognized, a variety of other approaches and techniques may be used.

iii. Exemplary Rotation Around Z-Axis

In one embodiment, the computing device 100 can determine rotation angles around the z-axis in world space. In one embodiment, rotations around the z-axis may be tilts of the markers 110 (e.g., head of the user). Thus, the computing device 100 may determine rotations around the z-axis by evaluating the difference of y coordinates of the two infrared markers (e.g., $\Delta y = y_2 - y_1$), such as shown in FIG. 9.

In one embodiment, the difference of y coordinates of the two infrared markers (e.g., $\Delta y = y_2 - y_1$) and the rotation angle (e.g., $\rho_z$) around the z-axis can be determined using the following expression: $\rho_z = -\Delta y \lambda \epsilon = (y_1 - y_2)\lambda\epsilon$. In one embodiment, the negative sign indicates that the direction of the rotation of the image data being displayed should be opposite of where the head (e.g., markers 110) is moving. In one embodiment, ϵ is a scaling constant to control the magnitude and/or sensitivity of the rotation. In one embodiment, the computing device 100 can determine a rotation angle around the z-axis for each frame of image data displayed. Thus, using this information, the computing device 100 can determine how much the image data being displayed should rotate around the z-axis. As will be recognized, a variety of other approaches and techniques may be used.

5. Exemplary Scaling

In one embodiment, as indicated Block 515 of FIG. 5, the computing device 100 can also determine the scaling (e.g., a scaling coefficient) of the image data being displayed (e.g., via the scaling module 240). To do so, the computing device 110 can regularly, periodically, and/or continuously receive position data from the tracking device 105. In one embodiment, this may allow the computing device 100 to determine how large or small a frame of image data, for example, should be displayed. For example, the relationship between the size of the image data being displayed and the distance of the markers 110 (e.g., the user's head) from the tracking device 105 may be an inverse relationship. In other words, the closer the markers 110 (e.g., the user's head) are to the tracking device 105, the larger the image data is displayed via the computing device 100. For instance, moving the markers closer to the display creates a zooming effect. Therefore, the computing device 100 can use the following expression to evaluate the scaling coefficient (e.g., s):

$$s = \frac{\varepsilon}{d_{head}}$$

In one embodiment, $\varepsilon$ is a constant and $d_{head}$ is the distance between markers 110 (e.g., user's head) and the tracking device 105. Via such calculations, the computing device 100 can determine the scaling coefficient for each frame of image data displayed. Thus, using this information, the computing device 100 can determine how large or small the image data should be displayed. As will be recognized, a variety of other approaches and techniques may be used.

6. Exemplary Display of Image Data

In one embodiment, to determine how to display each frame of image data (e.g., 3D image data), the computing device 100 can regularly, periodically, and/or continuously receive position data (e.g., positioning/movement of the markers 110) from the tracking device 105. Then, the computing device 100 can display the image data corresponding to the positioning/movement of the markers 110. For example, the computing device 100 can track the positioning/movement of markers 110 by determining the relative distance between the markers 110 and the tracking device 105. The computing device 100 can also determine the coordinates (x, y) of the markers 110 in the world space. The computing device 100 can then determine the rotation angles around the axes (x, y, z) in the world space and a scaling.

In one embodiment, the computing device 100 can then translate/transform the positioning/movement of one or more markers 110 (Block 520 of FIG. 5) and display image data accordingly. That is, the computing device 100 can determine how to display, for example, image data (e.g., on a frame by frame basis) based on the positioning/movement of the markers 110. In other words, the computing device 100 can cause display of image data based at least in part on (a) the distance between the markers 110 and the tracking device, (b) the coordinates of the markers 110 in world space, (c) the rotation angles of the markers 110 in world space, and (d) the scaling.

In various embodiments, this approach may allow users (e.g., radiologists, engineers, or video game players viewing 3D image data) to control how image data is displayed based on the positioning/movement of the markers 110 (e.g., attached to an apparatus worn by the user). In various embodiments, this may also allow a user to, for example, move his head and eyes as if he were viewing a 3D object in actual space.

III. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for displaying three-dimensional image data, the method comprising:
    causing display of a first display of three-dimensional image data based at least in part on (a) a first determined distance between a plurality of markers affixed to an apparatus worn by a user and a tracking device mounted in a fixed position, (b) first coordinates of the markers in world space, and (c) a first rotation angle of the markers in world space;
    determining a second distance between the markers and the tracking device, wherein the second distance is determined based at least in part on position data associated with the markers;
    determining second coordinates of the markers in world space based at least in part on the position data associated with the markers;
    determining, via a processor, a second rotation angle of the markers in world space based at least in part on the position data associated with the markers; and
    causing display of a second display of three-dimensional image data based at least in part on a change in position of the markers as determined from (a) the second distance, (b) the second coordinates, and (c) at least the second rotation angle,
    wherein the first determined distance is detected based in part on a determined distance between the plurality of markers and a determined height of the display in relation to at least one determined angle of the markers to the display.

2. The method of claim 1 further comprising receiving the position data associated with the markers read by the tracking device, wherein (a) the markers reflect light and (b) the tracking device reads the light reflected by the markers.

3. The method of claim 1 further comprising receiving the position data associated with the markers read by the tracking device, wherein (a) the markers emit light and (b) the tracking device reads the light emitted by the markers.

4. The method of claim 1 further comprising determining a scaling based at least in part on the position data associated with the markers, wherein causing display of the three-dimensional image data is further based at least in part on the scaling.

5. The method of claim 1, wherein the first and second coordinates of the markers in world space comprise an x-coordinate and a y-coordinate.

6. The method of claim 1, wherein the second rotation angle of the markers in the world space is selected from the group consisting of an x-rotation angle, a y-rotation angle, and a z-rotation angle.

7. The method of claim 1, wherein the second display of three-dimensional image data is displayed in a manner opposite from the change in position of the markers.

8. The method of claim 1, further comprising:
    determining the at least one angle of the markers to the display based in part on analyzing a coefficient of radians per pixel and the determined distance between the plurality of markers in relation to a value.

9. A computer program product for displaying three-dimensional image data, the computer program product comprising at least one non-transitory computer-readable storage medium having computer-readable program code portions stored therein, the computer-readable program code portions comprising:

an executable portion configured to cause display of a first display of three-dimensional image data based at least in part on (a) a first determined distance between a plurality of markers affixed to an apparatus worn by a user and a tracking device mounted in a fixed position, (b) first coordinates of the markers in world space, and (c) a first rotation angle of the markers in world space;

an executable portion configured to determine a second distance between the and the tracking device, wherein the second distance is determined based at least in part on position data associated with the markers;

an executable portion configured to determine second coordinates of the markers in world space based at least in part on the position data associated with the markers;

an executable portion configured to determine a second rotation angle of the markers in world space based at least in part on the position data associated with the markers; and an executable portion configured to cause display of a second display of three-dimensional image data based at least in part on a change in position of the markers as determined from (a) the second distance, (b) the second coordinates, and (c) at least the second rotation angle, wherein the first determined distance is detected based in part on a determined distance between the plurality of markers and a determined height of the display in relation to at least one determined angle of the markers to the display.

10. The computer program product of claim 9 further comprising an executable portion configured to receive the position data associated with the markers read by the tracking device, wherein (a) the markers reflect light and (b) the tracking device reads the light reflected by the markers.

11. The computer program product of claim 9 further comprising an executable portion configured to receive the position data associated with the markers read by the tracking device, wherein (a) the markers emit light and (b) the tracking device reads the light emitted by the markers.

12. The computer program product of claim 9 further comprising an executable portion configured to determine a scaling based at least in part on the position data associated with the markers, wherein causing display of the three-dimensional image data is further based at least in part on the scaling.

13. The computer program product of claim 9, wherein the first and second coordinates of the markers in world space comprise an x-coordinate and a y-coordinate.

14. The computer program product of claim 9, wherein the second rotation angle of the markers in the world space is selected from the group consisting of an x-rotation angle, a y-rotation angle, and a z-rotation angle.

15. The computer program product of claim 9, wherein the second display of three-dimensional image data is displayed in a manner opposite from the change in position of the markers.

16. The computer program product of claim 9, further comprising:

an executable portion configured to determine the at least one angle of the markers to the display based in part on analyzing a coefficient of *radians* per pixel and the determined distance between the plurality of markers in relation to a value.

17. An apparatus comprising at least one processor and at least one memory including computer program code, the at least one memory and the computer program code configured to, with the processor, cause the apparatus to at least:

cause display of a first display of three-dimensional image data based at least in part on (a) a first determined distance between a plurality of markers affixed to an apparatus worn by a user and a tracking device mounted in a fixed position, (b) first coordinates of the markers in world space, and (c) a first rotation angle of the markers in world space;

determine a second distance between the markers and the tracking device, wherein the second distance is determined based at least in part on position data associated with the markers;

determine second coordinates of the markers in world space based at least in part on the position data associated with the markers;

determine a second rotation angle of the markers in world space based at least in part on the position data associated with the markers; and cause display of a second display of three-dimensional image data based at least in part on a change in position of the markers as determined from (a) the second distance, (b) the second coordinates, and (c) at least the second rotation angle, wherein the first determined distance is detected based in part on a determined distance between the plurality of markers and a determined height of the display in relation to at least one determined angle of the markers to the display.

18. The apparatus of claim 17, wherein the memory and computer program code are further configured to, with the processor, cause the apparatus to receive the position data associated with the markers read by the tracking device, wherein (a) the markers reflect light and (b) the tracking device reads the light reflected by the markers.

19. The apparatus of claim 17, wherein the memory and computer program code are further configured to, with the processor, cause the apparatus to receive the position data associated with the markers read by the tracking device, wherein (a) the markers emit light and (b) the tracking device reads the light emitted by the markers.

20. The apparatus of claim 17, wherein the memory and computer program code are further configured to, with the processor, cause the apparatus to determine a scaling based at least in part on the position data associated with the markers, wherein causing display of the three-dimensional image data is further based at least in part on the scaling.

21. The apparatus of claim 17, wherein the first and second coordinates of the markers in world space comprise an x-coordinate and a y-coordinate.

22. The apparatus of claim 17 wherein the second rotation angle of the markers in the world space is selected from the group consisting of an x-rotation angle, a y-rotation angle, and a z-rotation angle.

23. The apparatus of claim 17, wherein the second display of three-dimensional image data is displayed in a manner opposite from the change in position of the markers.

24. The apparatus of claim 17, wherein the memory and computer program code are further configured to, with the processor, cause the apparatus to:

determine the at least one angle of the markers to the display by analyzing a coefficient of radians per pixel and the determined distance between the plurality of markers in relation to a value.

* * * * *